Nov. 2, 1926.

E. L. DE RAISNE

LATHING

Filed Jan. 5, 1926

1,605,176

Inventor
Edward L. De Raisne

By Mason Fenwick & Lawrence
Attorneys

Patented Nov. 2, 1926.

1,605,176

UNITED STATES PATENT OFFICE.

EDWARD L. DE RAISNE, OF RICHMOND, VIRGINIA.

LATHING.

Application filed January 5, 1926. Serial No. 79,427.

This invention relates to improvements in lathing, particularly in a construction or device for forming a corner section and the like common to the building of houses.

An object of this invention is to eliminate, or to reduce to the minimum, the use of corner studding for nailing the laths.

A further object of this invention is to provide means whereby the lathing elements will combine in interlocked relationship with the stud member, thereby eliminating the necessity of nailing the lathing elements to the stud member in a corner construction.

Another object of this invention is to provide a means whereby a solid and firm corner construction will be formed upon which to receive the plastering in such a manner as to prevent the wall from cracking longitudinally of the corner which is the common occurrence in the use of two corner studs upon which the lathing is nailed, the ends being in abutment.

Further objects of this invention will appear in the following detailed description of the method and device as disclosed in the single sheet of drawings herewith made a part of this application.

In the drawings,

Fig. 1 designates a perspective view of the lathing construction in its relationship with a corner studding.

Numerals 1 and 2 designate the ordinary stud elements or joists common in the building of houses, while numeral 3 designates a corner stud member.

In the construction of buildings, it is the practice to utilize two or more corner stud portions upon which to nail or tack the ends of laths, the ends of the laths being abutted to each other.

It is readily apparent that much labor and expense is involved in supplying the stud members and in nailing the laths in the manner as now practiced.

Figure 1:
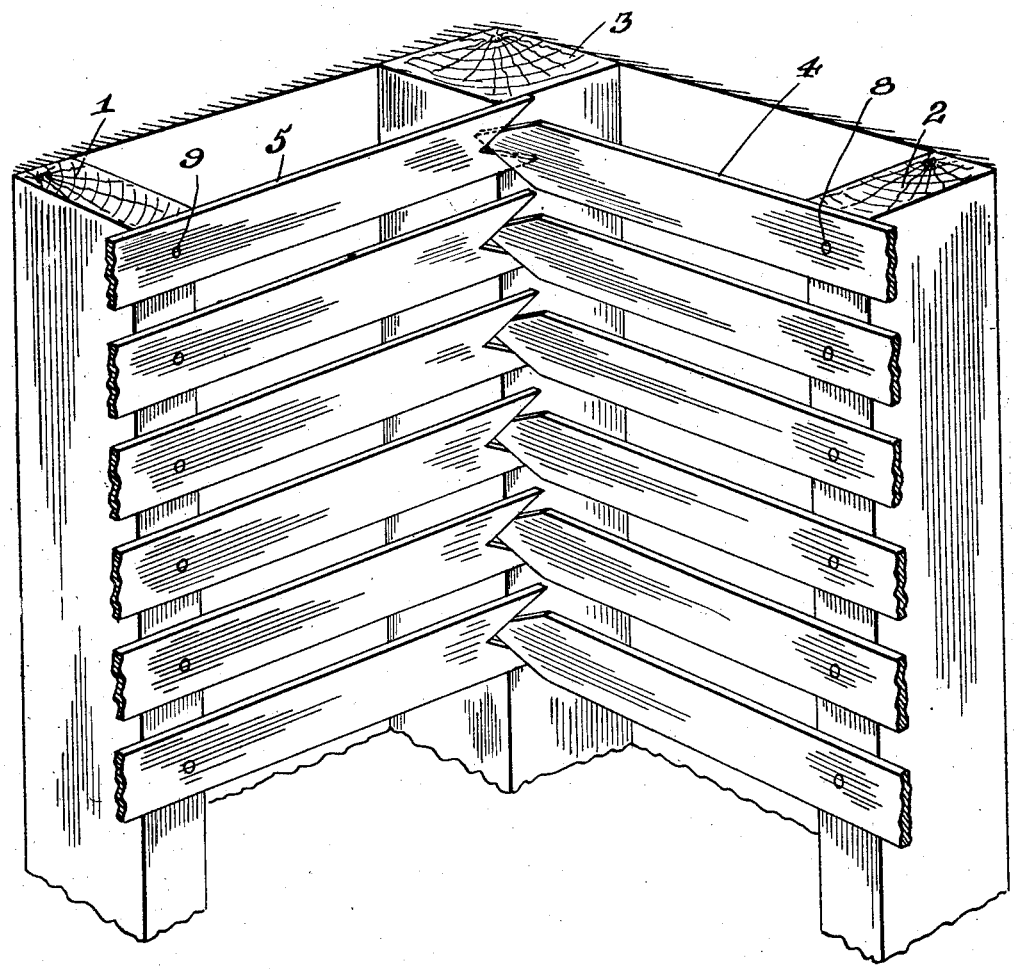
Figure 2:
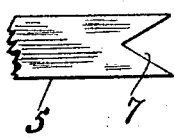
Fig. 2 illustrates a plan view of an end portion of one of the interlocking lathing elements having a notched portion.
Figure 3:
Fig. 3 illustrates a plan view of a portion of an interlocking lathing element having a pointed end portion.

This invention provides a means whereby the lathing elements 4 and 5 may be combined with a single stud member 3 in interlocked relationship, as disclosed in Fig. 1, thereby eliminating the necessity of nailing the ends of each corner lathing element to the single stud member, the pointed portion 6 being adapted to enter into interlocked relationship with the notched portion 7 of the cooperating lathing element 5, thereby eliminating the necessity of nailing the interlocking lathing elements to the stud member 3.

It is apparent that the lathing element 4 having a suitable end 6, may be positioned so firmly within the notched portion 7, of the lathing element 5, by means of nailing elements 8 and 9 that no need of tacking the end portion 6 and notched end portion 7 to the stud member 3 will exist.

In operation, this invention provides a means for reducing greatly, the expense incidental to the lathing of buildings and also provides a construction which will practically eliminates the ordinary corner trough studding, thereby preventing the wall from cracking longitudinally of the corner, for the reason that during the process of plastering over the lathing, the pointed portion 6 and the notched portion 7, as provided in this invention, tends to hold plastering in a solid joint, forming therefore, a corner that will be free from cracking.

A prime factor of this invention, is that it provides a means whereby none of the co-operating lathing elements in combination with the corner stud member will have to be nailed to the stud. A combination of a stud with two laths is formed whereby the end portion of one lath is positioned to pass through an end of the other lath thereby bringing them into interlocked engagement with the stud.

What I claim is:—

1. The combination with wall elements and studs, of lath-like members, the ends of the lath-like members being interlocked and held in proper relationship by the studs, thereby preventing relative movement of the lathing, the lath ends of one wall lying against one face of the stud while lath ends of an adjacent wall lie against an adjacent face of the stud.

2. The combination with wall elements and studs, of lath-like members having pointed and notched ends, the ends of the lath-like members being interlocked with each other and held in proper relationship by the studs thereby preventing relative movement of the lathing, the lath ends of one wall lying against one face of the stud while the lath ends of an adjacent wall lie against the adjacent face of the stud.

In testimony whereof I affix my signature.

EDWARD L. DE RAISNE.